(12) United States Patent
Futawatari (10) Patent No.: US 10,548,383 B2
(45) Date of Patent: Feb. 4, 2020

(54) NAIL PRINTER AND METHOD OF NAIL PRINTING

(71) Applicant: CASIO COMPUTER CO., LTD., Shibuya-ku, Tokyo (JP)

(72) Inventor: Shigeru Futawatari, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/389,652

(22) Filed: Apr. 19, 2019

(65) Prior Publication Data

US 2019/0328105 A1    Oct. 31, 2019

(30) Foreign Application Priority Data

Apr. 25, 2018 (JP) ................. 2018-083533

(51) Int. Cl.
| | |
|---|---|
| G06K 15/22 | (2006.01) |
| A45D 29/00 | (2006.01) |
| G06K 9/00 | (2006.01) |
| B41J 3/407 | (2006.01) |

(52) U.S. Cl.
CPC ............ *A45D 29/00* (2013.01); *B41J 3/4073* (2013.01); *G06K 9/0004* (2013.01); *A45D 2029/005* (2013.01)

(58) Field of Classification Search
None
See application file for complete search history.

(56) References Cited

U.S. PATENT DOCUMENTS

| 6,286,517 B1 * | 9/2001 | Weber ................. A45D 29/00 132/200 |
| 6,336,694 B1 * | 1/2002 | Ishizaka .............. A45D 29/00 347/105 |
| 2004/0143359 A1 * | 7/2004 | Yogo .................. A45D 31/00 700/161 |
| 2005/0036813 A1 * | 2/2005 | Sim .................... G07F 17/26 400/323 |

(Continued)

FOREIGN PATENT DOCUMENTS

| JP | H06176134 A | 6/1994 |
| JP | 2003534083 A | 11/2003 |
| JP | 2013192593 A * | 9/2013 |

(Continued)

*Primary Examiner* — Ted W Barnes
(74) *Attorney, Agent, or Firm* — Holtz, Holtz & Volek PC (57) ABSTRACT

A nail printer includes a print head, a placement table, a fingerprint sensor, a memory, a placement table shifter and a processor. The fingerprint sensor acquires reference information including a reference fingerprint image and reference positional information on a position of the reference fingerprint image in the placement table from an object placed at a reference position which is a position suitable for printing on a nail of the object on the placement table with the print head. The processor compares positional information on a fingerprint image of the object currently placed on the placement table with the reference positional information preliminarily stored in the memory, and controls the placement table shifter to shift the object based on a result of the comparing such that the position of the object on the placement table substantially agrees with the reference position.

9 Claims, 7 Drawing Sheets

(56) References Cited

U.S. PATENT DOCUMENTS

2011/0108047 A1* 5/2011 Goff ................... A45D 29/00
132/73.5

FOREIGN PATENT DOCUMENTS

| JP | 2013192593 A | | 9/2013 |
|----|--------------|---|--------|
| JP | 2015126953 A | * | 7/2015 |
| JP | 2015126953 A | | 7/2015 |

* cited by examiner

NAIL PRINTER AND METHOD OF NAIL PRINTING

CROSS REFERENCE TO RELATED APPLICATION

This application is based upon and claims the benefit of priority under 35 USC 119 of Japanese Patent Application No. 2018-083533 filed on Apr. 25, 2018, the entire disclosure of which, including the description, claims, drawings, and abstract, is incorporated herein by reference in its entirety.

BACKGROUND OF THE INVENTION

1. Field of the Invention

The present invention relates to a nail printer and a method of nail printing.

2. Description of Related Art

A nail printing apparatus or a nail printer is known that prints a nail design on a finger nail.

JP 2003-534083A discloses a nail printer that involves the placement of a finger having a target nail at a proper position suitable for print. The nail printer involves shooting the position of the nail with a camera in the apparatus, displaying the nail on a display, and allowing the user to confirm the position of the nail on the display to align the position of the finger to the fixed position, or fixing the finger at the proper position suitable for print with a fixture.

Unfortunately, the user cannot readily place the finger at a right position suitable for print and thus unintentionally place the finger at a wrong position or an improper angle. Print under such conditions may preclude high-definition print because of inaccurate recognition of the shape of the nail or deviation of the printed position.

Fixation of the finger at a right position forces the user to bear the burden due to an unnatural posture even if the print is carried out on the right position.

SUMMARY OF THE INVENTION

An object of the present invention is to provide a nail printer and a method of nail printing that can print a nail design on a finger placed at a position suitable for printing, without placing a burden on the user.

According to an aspect of the present invention, a nail printer includes:

a print head which performs printing on a surface of a nail to be printed;

a placement table on which an object having the nail is placed;

a fingerprint sensor which acquires reference information including a reference fingerprint image and reference positional information on a position of the reference fingerprint image in the placement table from the object placed at a reference position which is a position suitable for printing on the surface of the nail of the object on the placement table with the print head;

a memory which preliminarily stores the reference information acquired by the fingerprint sensor;

a placement table shifter which shifts the placement table in a planar direction while the object is being placed; and a processor which is operable to:

compare positional information on a fingerprint image of the object currently placed on the placement table with the reference positional information preliminarily stored in the memory; and control the placement table shifter to shift the object based on a result of the comparing such that the position of the object on the placement table substantially agrees with the reference position.

According to another aspect of the present invention, a nail printing method of a nail printer having a placement table on which an object having a nail to be printed is placed, includes:

acquiring reference information including a reference fingerprint image and reference positional information on a position of the reference fingerprint image in the placement table from the object placed at a reference position which is a position suitable for printing on a surface of the nail of the object on the placement table;

preliminarily storing the reference information;

comparing positional information on a fingerprint image of the object currently placed on the placement table with the reference positional information preliminarily stored; and shifting the placement table in a planar direction while the object is being placed based on a result of the comparing such that the position of the object on the placement table substantially agrees with the reference position.

BRIEF DESCRIPTION OF THE SEVERAL VIEWS OF THE DRAWING

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE PREFERRED EMBODIMENT

Hereinafter, one or more embodiments of the present invention will be described with reference to the drawings. However, the scope of the invention is not limited to the disclosed embodiments.

A nail printer according to an embodiment of the present invention will now be described with reference to FIGS. 1 to 11.

The following embodiment involves various technically preferred limitations for accomplishing the present invention. The scope of the invention, however, should not be limited to the embodiment and drawings.

In the following embodiment, the target of the nail printer is a finger nail of a hand, however, the target of the nail printer according to the present invention may be any nail other than the finger nail, for example, a toe nail.

Figure 1:
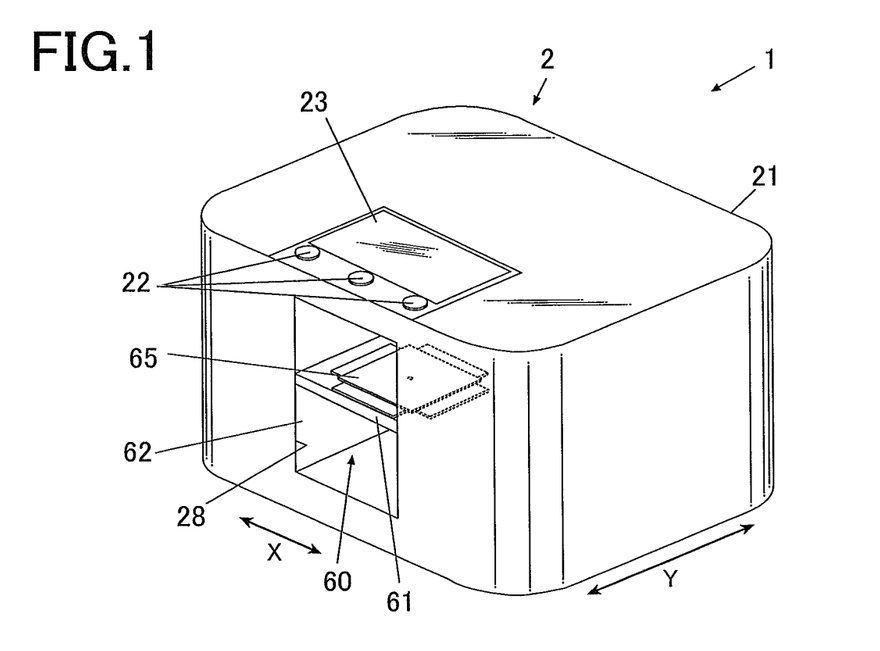
FIG. 1 is a perspective view showing an overall configuration of a nail printer according to the embodiment.

With reference to FIG. 1, a nail printer 1 which is a printing apparatus in this embodiment includes an apparatus housing (hereinafter simply referred as "housing") 21 formed in a substantially box shape.

Operation panel 22 is disposed on the upper surface or top panel of the housing 21.

The operation panel 22 is an input unit operated by a user to perform various input operations.

The operation panel 22 includes, for example, a power button for turning on the power of the nail printer 1, a stop button for stopping operation of the nail printer 1, and other operating buttons for performing various input operations.

The user can select a nail design to be printed on a nail T through the operation of the operation panel 22 in this embodiment.

A display 23 is disposed on the upper surface or top panel of the housing 21.

The display 23 may be, for example, a liquid crystal display (LCD), an organic electroluminescent display, or any other flat display.

In this embodiment, the display 23 displays various instructions and messages, as needed.

The display 23 may be integrated with a touch panel on its surface to receive various input operations. In this case, the touch panel functions as the operation panel 22.

A finger insertion opening 28 is provided on the front (or the near side in FIG. 1) of the housing 21. The finger insertion opening 28 is an opening through which the user inserts fingers before the nail printer 1 prints patterns on the nails.

A finger receiver 60 for receiving fingers inserted for printing is disposed behind the finger insertion opening 28.

Figure 2:
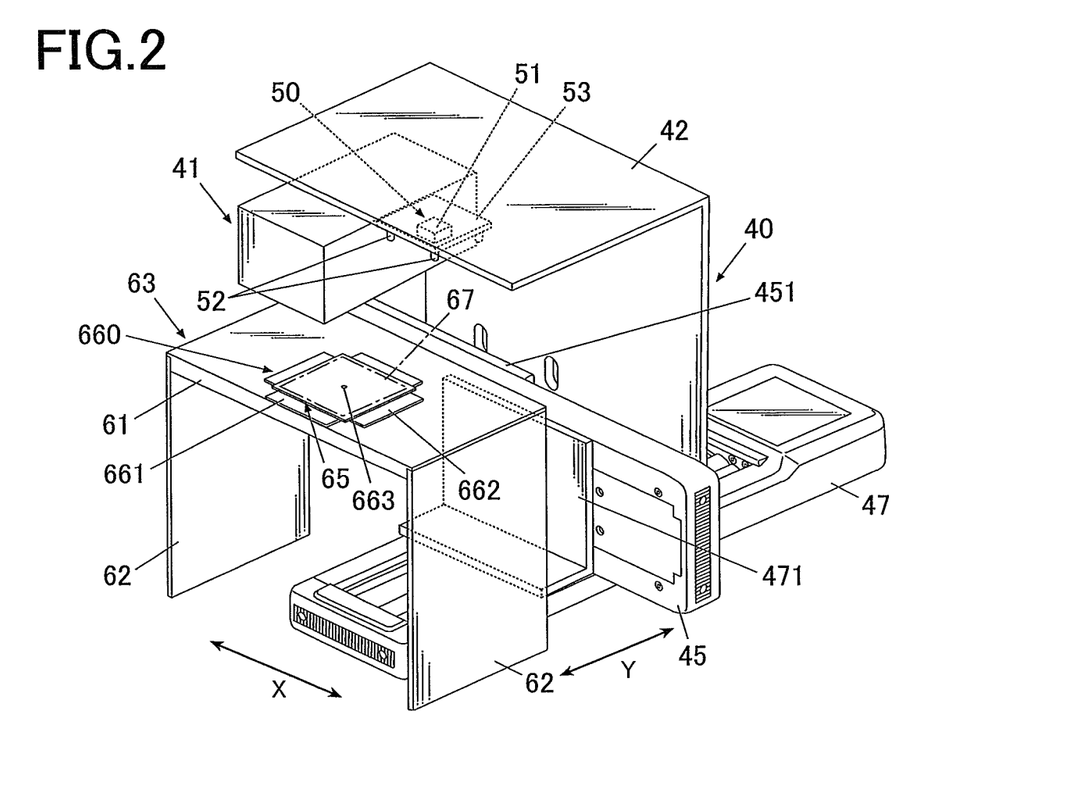
FIG. 2 is a perspective view of the essential portion of the internal configuration of the nail printer illustrated in FIG. 1.

FIG. 2 is a perspective view of the essential portion of the internal configuration of the nail printer 1 illustrated in FIG. 1 from which the housing 21 detached.

As shown in FIG. 2, the housing 21 includes a printer 40 for print on the nail T of a target finger U1, an image capturing unit 50 for capturing an image of the target finger U1, including the nail T, and a base 63.

The printer 40 includes a print head 41 as a body of the printer, a supporting member 42 for supporting the print head 41, an X-direction movement stage 45 for moving the print head 41 in the X direction (the X direction in FIG. 1 or the right-left direction of the nail printer 1), an X-direction movement motor 46, a Y-direction movement stage 47 for moving the print head 41 in the Y direction (the Y direction in FIG. 1 or the front-back direction of the nail printer 1), and a Y-direction movement motor 48. In this embodiment, the X-direction movement motor 46 and the Y-direction movement motor 48 constitute a print head moving mechanism 49 for moving the print head 41 (see FIG. 5).

The print head 41 according to this embodiment is an inkjet head for inkjet printing.

The print head 41 is of integrated cartridge type that includes ink cartridges (not shown), for example, for yellow (Y), magenta (M), and cyan (C) inks, and ink ejectors (not shown) integrated therewith. Each ink ejector is disposed on a surface (the lower surface in this embodiment illustrated in FIGS. 1 and 2), facing the printing target (surface of the nail T), of the ink cartridge. The ink ejector includes nozzle arrays each including multiple nozzles that eject different color inks. The print head 41 ejects microdroplets of ink from the ink ejector directly onto the surface of the printing target (nail T). The print head 41 may eject ink of any color other than the three colors mentioned above. Other ink cartridges and ink ejectors for other colors of ink may also be provided.

The supporting member 42 is fixed to an X-direction moving part 451 fixed to the X-direction movement stage 45. The X-direction moving part 451 moves in the X direction along a guide (not shown) on the X-direction movement stage 45 by the driving force of the X-direction movement motor 46. Thus, the print head 41 that attached to the supporting member 42 is configured to move in the X direction (the X direction in FIG. 2 or the right-left direction of the nail printer 1).

The X-direction movement stage 45 is fixed to a Y-direction moving part 471 of the Y-direction movement stage 47. The Y-direction moving part 471 moves in the Y direction along a guide (not shown) on the Y-direction movement stage 47 by the driving force of the Y-direction movement motor 48. Thus, the print head 41 that attached to the supporting member 42 is configured to move in the Y direction (the Y direction in FIG. 2 or the front-back direction of the nail printer 1).

The print head 41, the X-direction movement motor 46, and the Y-direction movement motor 48 of the printer 40 are connected to a print controller 816 of a controller 80 described below (see FIG. 5), and controlled by the print controller 816.

The image capturing unit 50 includes an imager 51 and illuminators 52.

The illuminators 52 of the image capturing unit 50 illuminates the nail T of the target finger U1 placed on a finger placement table 65 described below. The imager 51 captures the target finger U1 to obtain a nail image (or a finger image that includes the nail image) which is an image of the nail T of the target finger U1.

In this embodiment, a capturing substrate 53 is fixed to the supporting member 42 that supports the print head 41. The imager 51 and the illuminators 52, which constitute the image capturing unit 50, are equipped on the capturing substrate 53. The image capturing unit 50 can be moved in the X and Y directions by the supporting member 42, which is moved by the print head moving mechanism 49.

The imager 51 and the illuminators 52 may be provided at any positions, other than those illustrated in the drawings, facing the nail T of the target finger U1 placed on the finger placement table 65.

For example, the image capturing unit 50 may be disposed on the internal face of the top board of the housing 21. A moving mechanism for moving the image capturing unit 50 in the X and Y directions other than the print head moving mechanism 49 may be provided to move the image capturing unit 50.

The imager 51 is, for example, a compact camera including a solid-state image sensor provided with approximately 2 million or more pixels and one or more lenses.

The imager 51 captures the nail T to obtain a nail image including an image of the target finger U1. A nail information detector 814 described below detects nail information, such as the outline or shape, the curved shape or curvature, and the vertical position of the nail T, based on the nail image.

The illuminators 52 are, for example, white LEDs.

Two illuminators 52 are disposed on the right and left of the imager 51 such that the imager 51 is disposed between them. The illuminators 52 emit light downward to illuminate a shooting area below the imager 51. Any number of illuminators 52 may be disposed at any positions.

The image capturing unit 50 is connected to the imaging controller 811 of the controller 80 described below (see FIG. 5) and controlled by the imaging controller 811.

The data of an image shot by the image capturing unit 50 may be stored in a memory 82 described below.

The base 63 includes a partition 61 constituting an XY plane facing the ink ejectors of the print head 41, and a pair of supporting member 62 supporting the partition 61 at a certain level.

The base 63 is disposed in the finger receiver 60 behind the finger insertion opening 28, and the finger receiver 60 is divided into upper and lower spaces by the partition 61.

The finger placement table 65 for receiving the target finger U1 having the nail T to be printed is disposed near the center in the X direction of the upper side of the partition 61.

The upper surface of the finger placement table 65 is a finger placement surface 651 on which the target finger U1 is to be placed.

Further, the lower side of the partition 61 is a space in which the fingers other than the target finger U1 are placed. The finger placement table 65 may have any shape and be placed at any position other than that illustrated in the drawings.

In this embodiment, a finger placement table shifter 660 shifts in planar direction the finger placement table 65 while the target finger U1 is being placed on the finger placement table 65. The finger placement table shifter 660 shifts the finger placement table 65 in the X and Y directions on the partition 61.

The finger placement table 65 is configured to be able to rotate in the planar direction.

In detail, a rotary shaft 663 orthogonal to an in-plane direction is provided substantially at the center of the in-plane direction of the finger placement table 65, and rotatably mounted to the X-direction shifting stage 661 that shifts the finger placement table 65 in the X direction (the X direction in FIG. 1, the right-left direction of the nail printer 1 or lateral direction of the placement table 65).

The rotary shaft 663 is driven by the finger placement table rotating motor 667 (see FIG. 5) to rotate clockwise and counterclockwise.

The X-direction shifting stage 661 is slidably locked to the Y-direction shifting stage 662 to shift the finger placement table 65 in the Y direction (the Y direction in FIG. 1, the front-back direction of the nail printer 1 or a longitudinal direction of the placement table 65).

The Y-direction shifting stage 662 is provided with a guide rail (not shown) in the X direction, and the X-direction shifting stage 661 is driven by the X-direction shifting motor 665 to slide in the X direction along the guide rail of the Y-direction shifting stage 662.

A guide rail (not shown) is provided on the upper surface of the partition 61 in the Y direction, and the Y-direction shifting stage 662 is driven by the Y-direction shifting motor 666 to slide in the Y direction along the guide rail on the partition 61.

Alternatively, the X-direction shifting stage 661 may slide in the Y direction along the guide rail on the upper surface of the partition 61, and the Y-direction shifting stage 662 may slide in the X direction along the guide rail of the X-direction shifting stage 661. In this case, the rotary shaft 663 is rotatably mounted to the Y-direction shifting stage 662.

In this embodiment, the X-direction shifting motor 665 and the Y-direction shifting motor 666 constitute an XY shifter that shifts the finger placement table 65 in the X and Y directions, and the finger placement table rotating motor 667 constitutes a rotator that rotates the finger placement table 65 in the planar direction. The XY shifter and the rotator constitute a finger placement table shifter 660 (see FIG. 5) that shifts the finger placement table 65 with three-axis in the X and Y directions and the rotational direction.

The finger placement table shifter 660 may have any configuration, other than those illustrated in the drawings, that allows the finger placement table 65 to shift in the X and Y directions and in the rotational direction.

The X-direction shifting motor 665, the Y-direction shifting motor 666, and the finger placement table rotating motor 667, which constitute the finger placement table shifter 660, are connected to the finger placement table controller 813 of the controller 80 (see FIG. 5) described below and controlled by the finger placement table controller 813.

The movable range of the finger placement table 65 by the finger placement table shifter 660 is determined depending on the size of the apparatus and the like. The finger placement table 65 can rotate around the rotary shaft 663 such that it does not come into contact with the walls or surroundings in the apparatus.

The finger placement table 65 may have any size or shape other than that illustrated in the drawings. For example, a circular finger placement table 65, which is less likely to come into contact with the surroundings than the rectangular finger placement table 65, can rotate in a wider range.

With reference to FIG. 2 and FIGS. 6 to 10, a fingerprint sensor 67 is disposed on the upper surface (the finger placement surface 651) of the finger placement table 65.

The fingerprint sensor 67 is a biological information acquirer that acquires a fingerprint image as a biological information pattern that can identify an individual from the target finger U1 placed on the finger placement table 65 (the finger placement surface 651 of the finger placement table 65).

In this embodiment, the fingerprint sensor 67 is disposed to cover a substantially entire area of the upper surface of the finger placement table 65 (the finger placement surface 651) so that the fingerprint sensor 67 can read a fingerprint image from the target finger U1 placed anywhere on the finger placement surface 651.

The fingerprint sensor 67 may be disposed at any position or cover any range other than that illustrated in the drawings.

Figure 3:
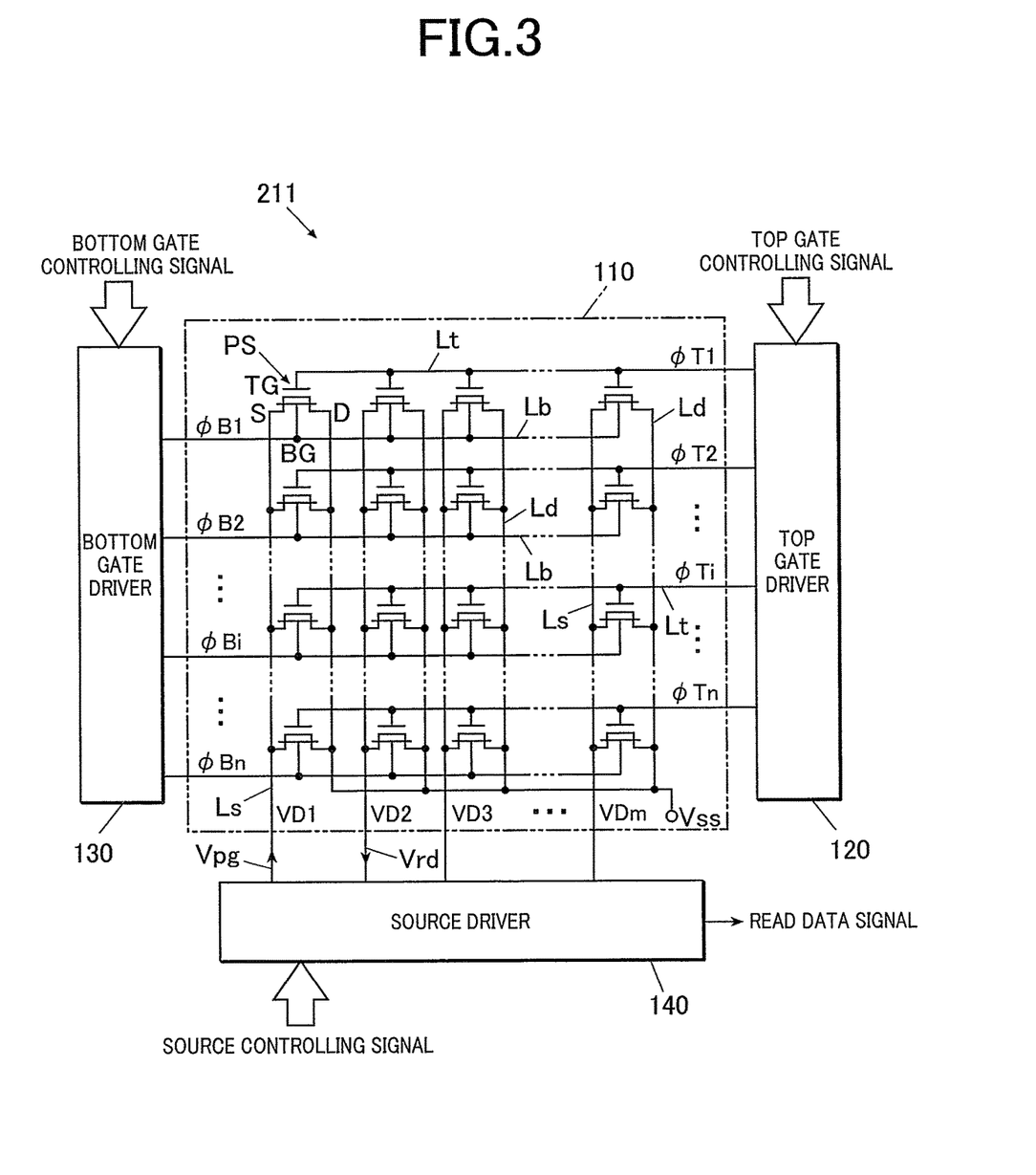
FIG. 3 is a systematic diagram of the essential portion of an exemplary sensor according to the embodiment.
Figure 4A:
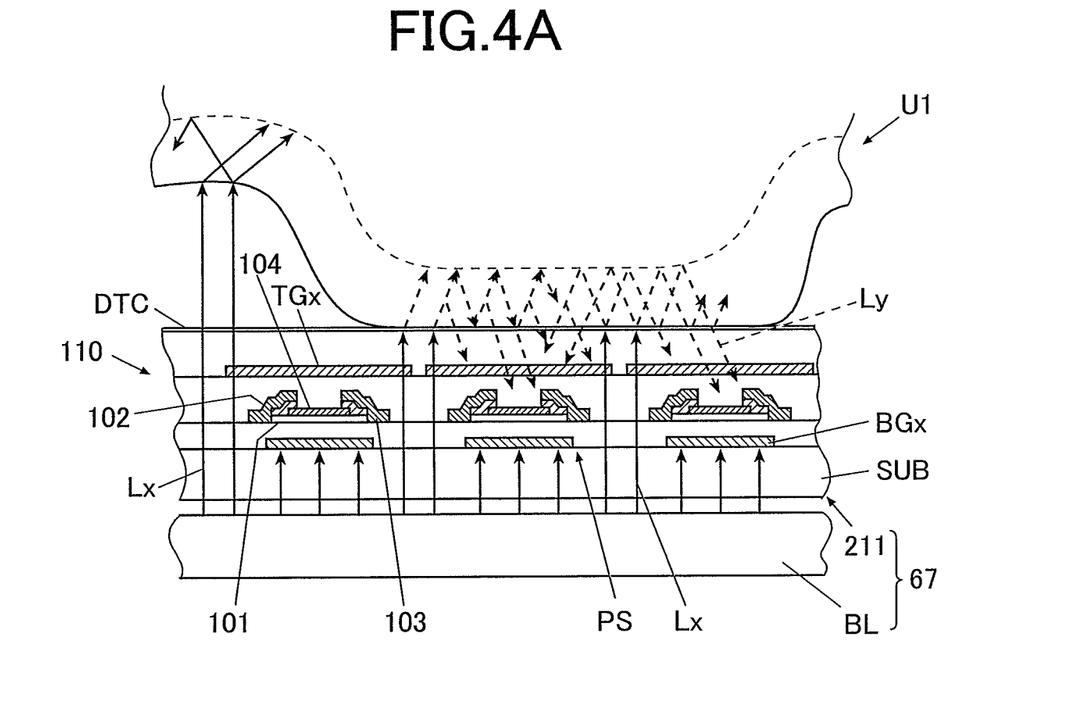
FIG. 4A is a conceptual diagram illustrating the reading operation of a fingerprint image with a fingerprint sensor according to the embodiment.
Figure 4B:
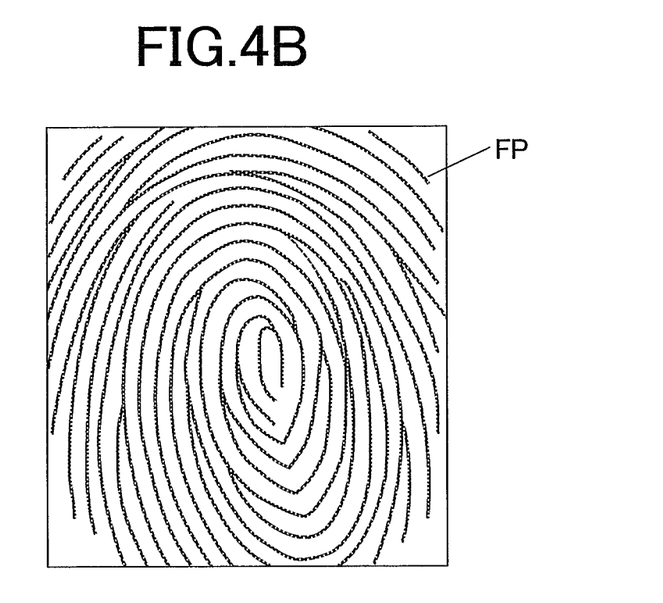
FIG. 4B is an exemplary fingerprint image read with the fingerprint sensor according to the embodiment.

FIG. 3 is a systematic diagram of the essential portion illustrating an exemplary configuration of a sensor 211 of the fingerprint sensor 67 according to this embodiment. FIG. 4A is a conceptual diagram illustrating the reading operation of a fingerprint image with the fingerprint sensor 67. FIG. 4B is an exemplary fingerprint image read with the fingerprint sensor 67.

With reference to FIG. 4A, the fingerprint sensor 67 according to this embodiment includes a sensor 211 and a backlight BL below the sensor 211.

With reference to FIG. 3, the sensor 211 according to this embodiment includes photo sensors PS (double-gate photo sensors) each having a structure of the double-gate thin film transistor disclosed in, for example, JP 2005-242841A. The sensor 211 includes a photo sensor alley 110, top gate lines $L_t$, bottom gate lines $L_b$, source lines (data lines) $L_s$, drain lines (common lines) $L_d$, a top gate driver 120, a bottom gate driver 130, and a source driver 140. The photo sensor alley 110 is a two-dimensional array or matrix of n rows and m columns (n and m are natural numbers) of numerous photo sensors PS (pixels to be read) disposed on a transparent substrate SUB (see FIG. 4A). The top gate lines $L_t$ extend from the top gate terminals TG of the photo sensors PS in the row direction. The bottom gate lines $L_b$ extend from the bottom gate terminals BG of the photo sensors PS in the row direction. The source lines (data lines) $L_s$ extend from the source terminals S (source electrodes 102 in FIG. 4A) of the photo sensors PS in the column direction. The drain lines (common lines) $L_d$ connect drain terminals D (drain electrodes 103 in FIG. 4A) to a predetermined low potential (for example, a grounding potential) $V_{ss}$. The top gate driver 120 is connected to the top gate lines $L_t$. The bottom gate driver 130 is connected to the bottom gate lines $L_b$. The source driver 140 is connected to the source lines $L_s$.

The top gate driver 120, the bottom gate driver 130, and the source driver 140 in the sensor 211 according to this embodiment are each a driver integrated circuit (IC) chip and disposed or implemented in the vicinity of the photo sensor alley 110 on the transparent substrate SUB.

A method of reading the fingerprint of the target finger U1 with the fingerprint sensor 67 will be described with reference to FIGS. 4A and 4B.

The user places the target finger U1 on the finger placement table 65 such that the ball of the target finger U1 comes into close contact with a detecting surface DTC on the upper surface of the photo sensor alley 110 at the start of read of a fingerprint.

In response to a top gate controlling signal, the top gate driver 120 applies a low-level bias voltage $\varphi T_i$ (for example, a top gate voltage $V_{tg}$ of −15 V) to the top gate terminals TG to start a charge (carrier) accumulating operation.

Light $L_x$ emitted from the backlight BL below the transparent substrate SUB in which the photo sensors PS are provided is reflected on the target finger U1 placed on the detecting face DTC. The reflected light $L_y$ passes through top gate electrode layers TG, or transparent electrode layers, and enters semiconductor layers 101. This generates pairs of electrons and holes in an incident effective region, i.e., a carrier generating region, of each semiconductor layer 101, depending on the light intensity incident on the semiconductor layer 101, resulting in the accumulation of holes in the vicinity of the interface between the semiconductor layer 101 and a block insulating film 104, i.e., in the periphery of a channel region (accumulation of charges).

In response to a source gate controlling signal, the source driver 140 applies a pre-charge pulse (for example, with a pre-charge voltage $V_{pg}$ of +5 V) to the source terminals S to start a pre-charge operation for storing charges in the source electrodes 102, in parallel with the charge accumulating operation.

After the charge accumulating and pre-charge operations, the bottom gate driver 130 applies a read pulse $\varphi B_i$ (for example, with a high bottom gate voltage or read pulse voltage $V_{bg}$ of +10 V) to the bottom gate terminals BG through the bottom gate lines $L_b$ in response to a bottom gate controlling signal. The source driver 140 then reads a source line voltage VD (a data voltage $V_{rd}$ or voltage signal), which varies depending on the carriers (holes) accumulated in the channel region during the charge accumulating operation.

During the application (reading) period of the reading pulse $\varphi B_i$, the source line voltage VD or data voltage $V_{rd}$ tends to vary as follows: If a large number of carriers are accumulated during the charge accumulating operation (bright conditions), the voltage drops sharply; or if a small number of carriers are accumulated (dark conditions), the voltage drops gradually. This indicates that the detection of the data voltage $V_{rd}$, for example, after the elapse of a certain time from the start of the reading operation can determine the light intensity incident on the photo sensors PS, i.e., luminosity data (brightness information) corresponding to the tone pattern of the subject.

The cycle of detection of the luminosity for a certain row i is repeated for all the rows (i=1, 2, . . . n) of the photo sensor alley 110 to read a two-dimensional image (fingerprint image) for the fingerprint FP of the target finger U1 in the form of luminosity data, as shown in FIG. 4B.

In this embodiment, not only the position of the fingerprint FP on the XY plane but also a pattern of the fingerprint FP, including the orientation of the fingerprint FP on the finger placement table 65, can be detected accurately. The fingerprint image data read by the fingerprint sensor 67 is accurate enough to allow a fingerprint comparator 812 described below to check the position and orientation of the fingerprint FP on the XY plane against those of other fingerprint image data.

The fingerprint image data read by the fingerprint sensor 67 is stored in a fingerprint information memory 822 described below of the memory 82.

In this embodiment, the fingerprint sensor 67 (biological information acquirer) preliminarily acquires a fingerprint image (biological information pattern) of the target finger U1 in a state where the nail T is placed on the finger placement table 65 at a position and at an angle suitable for printing with the printer 40, i.e., placed at a reference position. The fingerprint information memory 822 stores reference information including the preliminarily acquired fingerprint image as a reference fingerprint image (reference biological information pattern), and reference positional information on the reference fingerprint image (reference biological information pattern) on the finger placement table.

To acquire the reference information, for example, the image capturing unit 50 may shoot the target finger U1 and the nail T and display the captured image on the display 23 to guide the user to place the target finger U1 or the nail T at the reference position exactly. Alternatively, a frame or symbol may be marked on the finger placement surface 651 to indicate a position at which the target finger U1 should be positioned. Alternatively, the positional information on the acquired fingerprint image may be adjusted so as to be reference positional information with the operation panel 22, and the reference information may include a reference fingerprint image of the adjusted fingerprint image and reference positional information on the adjusted positional information.

The controller 80 is disposed on a substrate (not shown) provided on, for example, the lower face of the top board of the housing 21.

Figure 5:
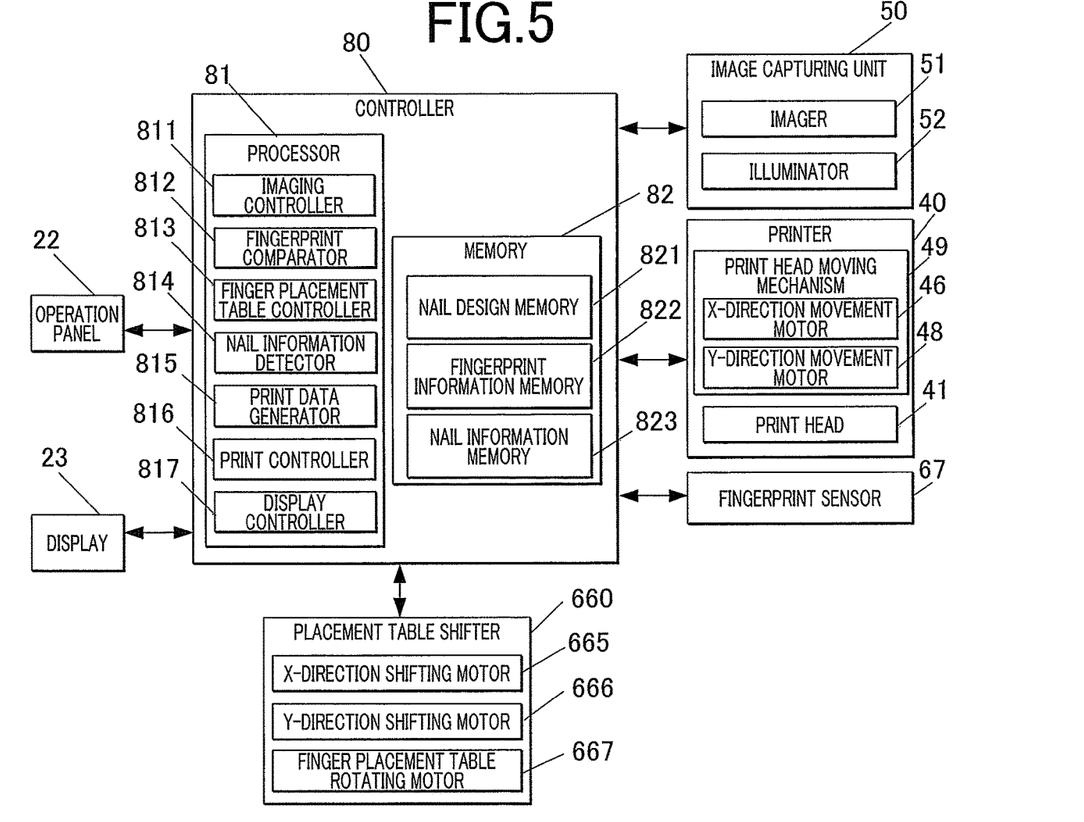
FIG. 5 is a block diagram of the essential portion illustrating a control scheme of the nail printer according to the embodiment.

FIG. 5 is a block diagram of the essential portion illustrating a control scheme according to this embodiment.

With reference to FIG. 5, the controller 80 is a computer including a processor 81 and a memory 82, where the processor 81 includes a central processing unit (CPU) (not shown), and the memory 82 includes a read only memory (ROM) and a random access memory (RAM) (both not shown).

The memory 82 stores various programs and data items for operating the nail printer 1.

In detail, the ROM of the memory 82 stores programs, such as a fingerprint matching program for detecting the position and orientation of the fingerprint of the target finger U1, a finger placement table controlling program for shifting the finger placement table 65 to a position suitable for print, a nail information detecting program for detecting nail information from a nail image, such as the shape, outline, width, and area of the nail T, a print data generating program for generating print data, and a printing program for perform printing. These programs are executed by the controller 80 to comprehensively control the components of the nail printer 1.

The memory 82 according to this embodiment includes a nail design memory 821 for storing image data for a nail design to be printed on the nail T, a fingerprint information memory 822 for storing data of a fingerprint image of the target finger U1 read by the fingerprint sensor 67, and a nail information memory 823 for storing nail information (outline and tilt angle of the nail T) detected by the nail information detector 814.

Any other information may be stored in the memory 82, for example, a nail image of the nail T of the target finger U1 of the user captured by the image capturing unit 50 may be stored.

The reference information stored in the fingerprint information memory 822 will be described in detail.

In this embodiment, the fingerprint sensor 67 preliminarily acquires a reference fingerprint image (reference biological information pattern) of the target finger U1 in a state where the nail T is placed on the finger placement table 65 at a suitable position (reference position) for printing with the printer 40. The fingerprint information memory 822 stores reference information including the reference fingerprint image and the reference positional information on the reference fingerprint image on the finger placement table.

Figure 6:
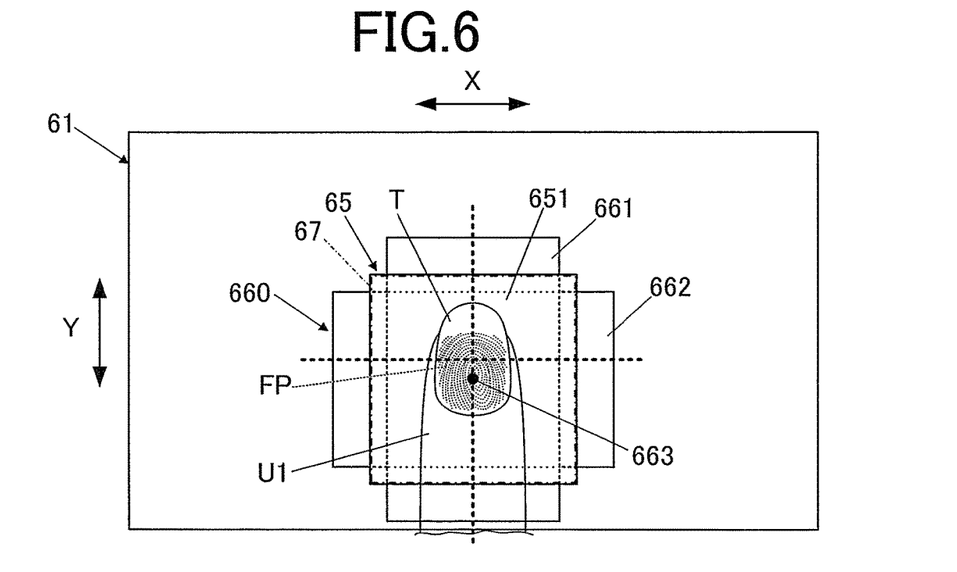
FIG. 6 is a top view of a partition illustrating a target finger placed on a finger placement table at a position suitable for printing.

FIG. 6 is a schematic plan view illustrating a positional relation between the finger placement table and the target finger when the reference information is acquired. FIGS. 6 to 10 illustrate the finger placement table 65 and the target finger U1 viewed from the side of the nail T, i.e., from the top. Although the fingerprint FP on the ball of the target finger U1 is not actually exposed, it is shown in the drawings for convenience of explanation.

In this embodiment, in the state where centers of length in a width and length directions of the nail T is almost provided at an intersection of dashed cross lines, and the length direction of the nail T substantially extend along the vertical line (the Y direction) of the dashed cross lines, it is assumed that the nail T is placed at the position suitable for printing by the printer 40. The fingerprint FP (biological information pattern) in FIG. 6 indicates the position and orientation of the fingerprint FP in this state.

In this embodiment, the image and positional information on the fingerprint FP captured in the state shown in FIG. 6 are preliminarily stored in the fingerprint information memory 822 as reference information including the reference finger image and its reference positional information.

The reference finger image and the reference positional information constituting the reference information are preliminarily acquired for all the target fingers.

The type of finger (i.e., for example, the right or left hand and the type of finger, such as the mid finger of the right hand) may be stored in correlation with the reference information.

In the case where the nail printer 1 is used by multiple users, the type of finger and a user name may be stored in correlation with the reference information for each user.

The storage of such information in correlation with the reference information allows the nail printer to automatically identify the user name and the type of finger from a fingerprint image of the target finger U1 placed on the finger placement table 65.

The processor 81 functionally includes an imaging controller 811, a fingerprint comparator 812, a finger placement table controller 813, a nail information detector 814, a print data generator 815, a print controller 816, and a display controller 817. The functions of the imaging controller 811, the fingerprint comparator 812, the finger placement table controller 813, the nail information detector 814, the print data generator 815, the print controller 816, and the display controller 817 are achieved by the CPU of the processor 81 in cooperation with the programs stored in the ROM of the memory 82.

The imaging controller 811 controls the imager 51 and the illuminators 52 of the image capturing unit 50 and causes the imager 51 to shoot the target finger U1 placed on the finger placement table 65 to acquire an image of the nail T including the target finger U1 (hereinafter referred to as a "nail image").

The data of the nail image captured by the image capturing unit 50 may be stored in the memory 82.

In response to the acquisition of a fingerprint image which is biological information pattern by the fingerprint sensor 67, the fingerprint comparator 812 compares the fingerprint image with the reference fingerprint images preliminarily stored in the fingerprint information memory 822.

In detail, the fingerprint sensor 67 acquires the fingerprint image and its positional information at the finger placement table 65 of the user's current state (at the time of printing), the fingerprint comparator 812 reads out multiple reference fingerprint images of the user acquired and stored in the fingerprint information memory 822 preliminarily, and then compares or matches the fingerprint patterns to identify the target finger U1 placed on the finger placement table 65. The fingerprint comparator 812 then detects the degree of deviation of the current position of the target finger U1 (positional information on the fingerprint image) from the reference position (reference positional information).

Figure 7:
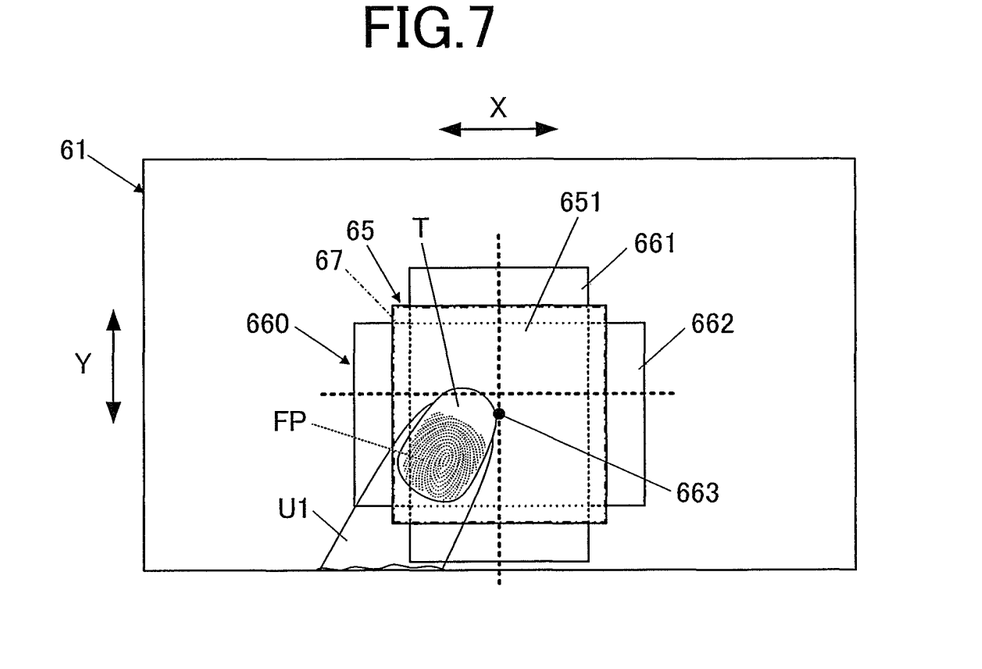
FIG. 7 is a top view of a partition illustrating a target finger placed on a finger placement table at a position deviated from the normal position suitable for print.

For example, in the case where the user places the target finger U1 at the position and in the orientation shown in FIG. 7 for printing and a fingerprint FP image is acquired by the fingerprint sensor 67, the fingerprint comparator 812 searches the fingerprint information memory 822 containing multiple reference fingerprint images for the image having the same fingerprint FP pattern as that of the current fingerprint image. The reference fingerprint image of the fingerprint FP, as shown in FIG. 6, is thereby read out. The fingerprint comparator 812 then compares the positional information on the current (at the time of printing) fingerprint image of the user acquired by the fingerprint sensor 67

(for example, see FIG. 7) with the reference positional information on the reference fingerprint image.

The fingerprint comparator 812 may use any comparing technique. For example, the fingerprint comparator 812 may match the current positional information with reference positional information by pattern matching and determine the distance of shift (the distance of deviation) required to reach the reference position. Any pattern matching technique may be used, for example, pattern matching may be performed by calculation of the correspondence on multiple characteristic points.

In the case where a fingerprint image having positional information as shown in FIG. 7 is acquired, the fingerprint comparator 812 determines that the target finger U1 is placed leftward position in the X direction and is placed frontward position in the Y direction (the downside direction in FIG. 7) from the reference position suitable for printing. The fingerprint comparator 812 also determines the clockwise tilt of the target finger U1 from the position suitable for printing.

The distances of deviation in the X and Y directions and the tilt angle of the target finger U1 detected by the fingerprint comparator 812 are transmitted to the finger placement table controller 813.

The finger placement table controller 813 controls the finger placement table shifter 660 to shift the finger placement table 65 while the target finger U1 is being placed thereon until the current position of the target finger U1 on the finger placement table 65 agrees with the reference position based on the results of comparing by the fingerprint comparator 812.

Figure 8:
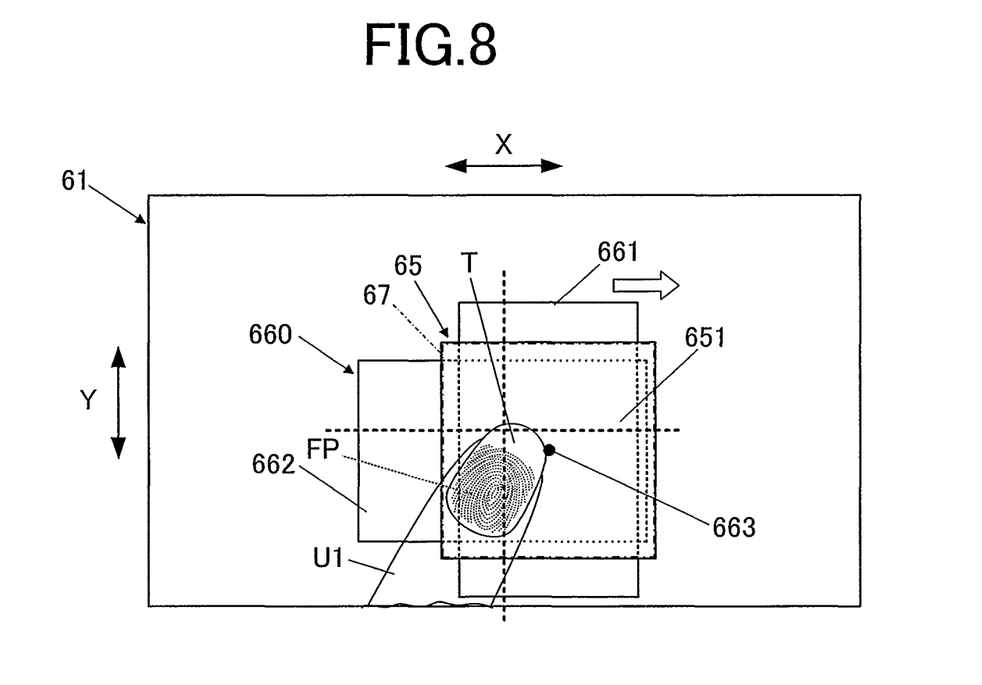
FIG. 8 is a top view of a partition illustrating a finger placement table shifted right in the X direction from the position illustrated in FIG. 7.
Figure 9:
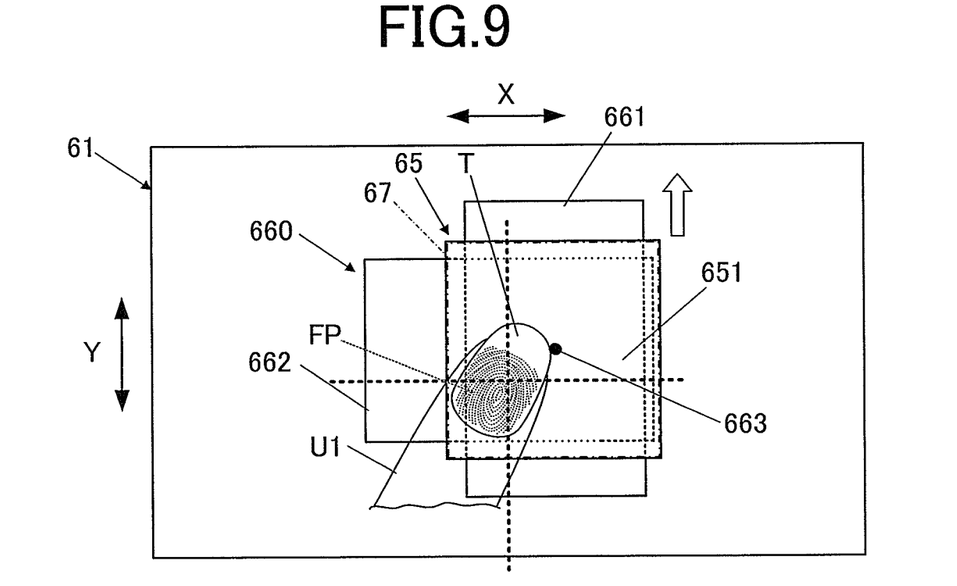
FIG. 9 is a top view of a partition illustrating a finger placement table shifted rearward in the Y direction from the position illustrated in FIG. 8.

For example, in the case of the reference positional information shown in FIG. 6 and the current fingerprint image of the user shown in FIG. 7, the finger placement table controller 813 causes the X-direction shifting motor 665 to shift the finger placement table 65 rightward in the X direction by the distance of deviation determined by the fingerprint comparator 812, as shown in FIG. 8. The finger placement table controller 813 causes the Y-direction shifting motor 666 to shift the finger placement table 65 to the rearward of the printer, i.e., in the Y direction (in the upside direction in FIG. 9) by the distance of deviation determined by the fingerprint comparator 812, as shown in FIG. 9. Furthermore, the finger placement table controller 813 causes the finger placement table rotating motor 667 to rotate the finger placement table 65 around the rotary shaft 663 counterclockwise (in the direction of the black arrow in FIG. 10) by the angle of deviation determined by the fingerprint comparator 812, as shown in FIG. 10.

Figure 10:
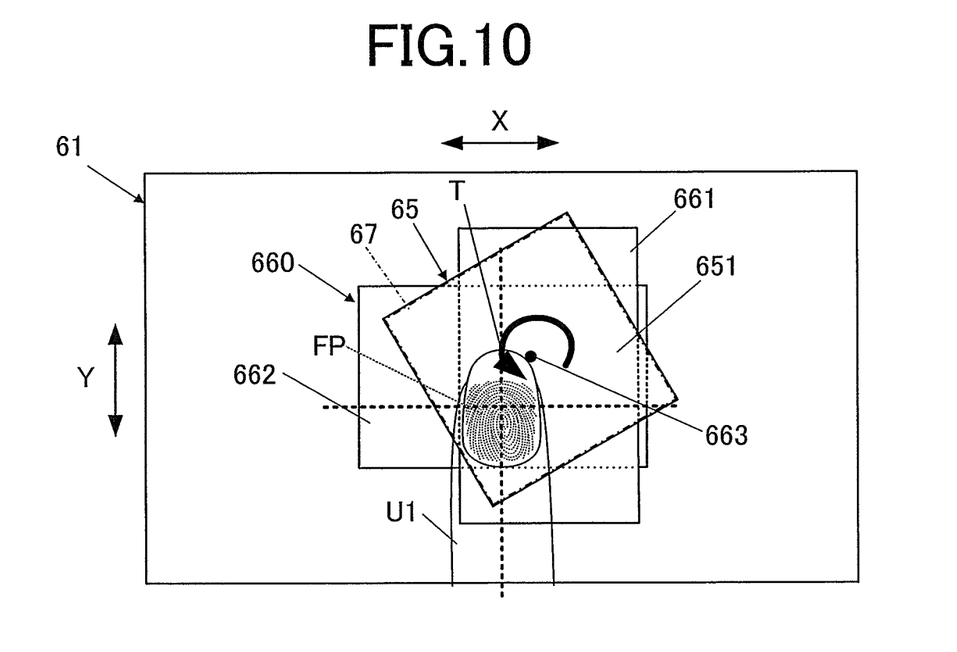
FIG. 10 is a top view of a partition illustrating a finger placement table rotated counterclockwise from the position illustrated in FIG. 9.

This results in, similar to the reference information shown in FIG. 6, the nail T is placed at the position suitable for printing (reference position) where the center of length in the width and length directions of the nail T is almost provided at the intersection of the dashed cross lines, and the length direction of the nail T substantially extend along the vertical line (the Y direction) of the dashed cross lines, as shown in FIG. 10.

The nail information detector 814 detects nail information on the nail T of the target finger U1 based on the image of the nail T of the target finger U1 (nail image) shot by the imager 51.

The nail information includes, for example, the outline, shape and the X and Y coordinates on the horizontal plan of the nail T, the height or vertical position of the nail T (hereinafter referred to as "the vertical position of the nail T" or simply referred to as "the position of the nail T"), and the tilt angle of the surface of the nail T relative to the XY plane (the tilt angle or curvature of the nail T).

The nail information detector 814 may use any technique of detecting nail information from the image.

The print data generator 815 generates data to be printed with the print head 41 on the nail T of the target finger U1 based on the nail information detected by the nail information detector 814.

In detail, the print data generator 815 reads out image data for a nail design to be selected for printing on the nail T from the nail design memory 821, and expands, shrinks and trims the image data for the nail design based on the shape of the nail T detected by the nail information detector 814 so that the nail design fits the shape of the nail T.

The print data generator 815 corrects the image data, such as curvature, based on the nail information detected by the nail information detector 814, as needed.

These processes generate print data for the nail design to be printed with the print head 41.

The print controller 816 outputs controlling signals to the printer 40 based on the print data generated by the print data generator 815 and controls the X-direction movement motor 46, the Y-direction movement motor 48, and the print head 41 of the printer 40 so that a pattern is printed on the nail T in accordance with the print data.

The display controller 817 controls the display 23 to display various menus on the display 23. In this embodiment, the display controller 817 displays, for example, a nail design selecting menu, a thumbnail image for confirming the design, a nail image acquired by shooting the target finger U1, and various instruction and operation menus on the display 23.

Figure 11:
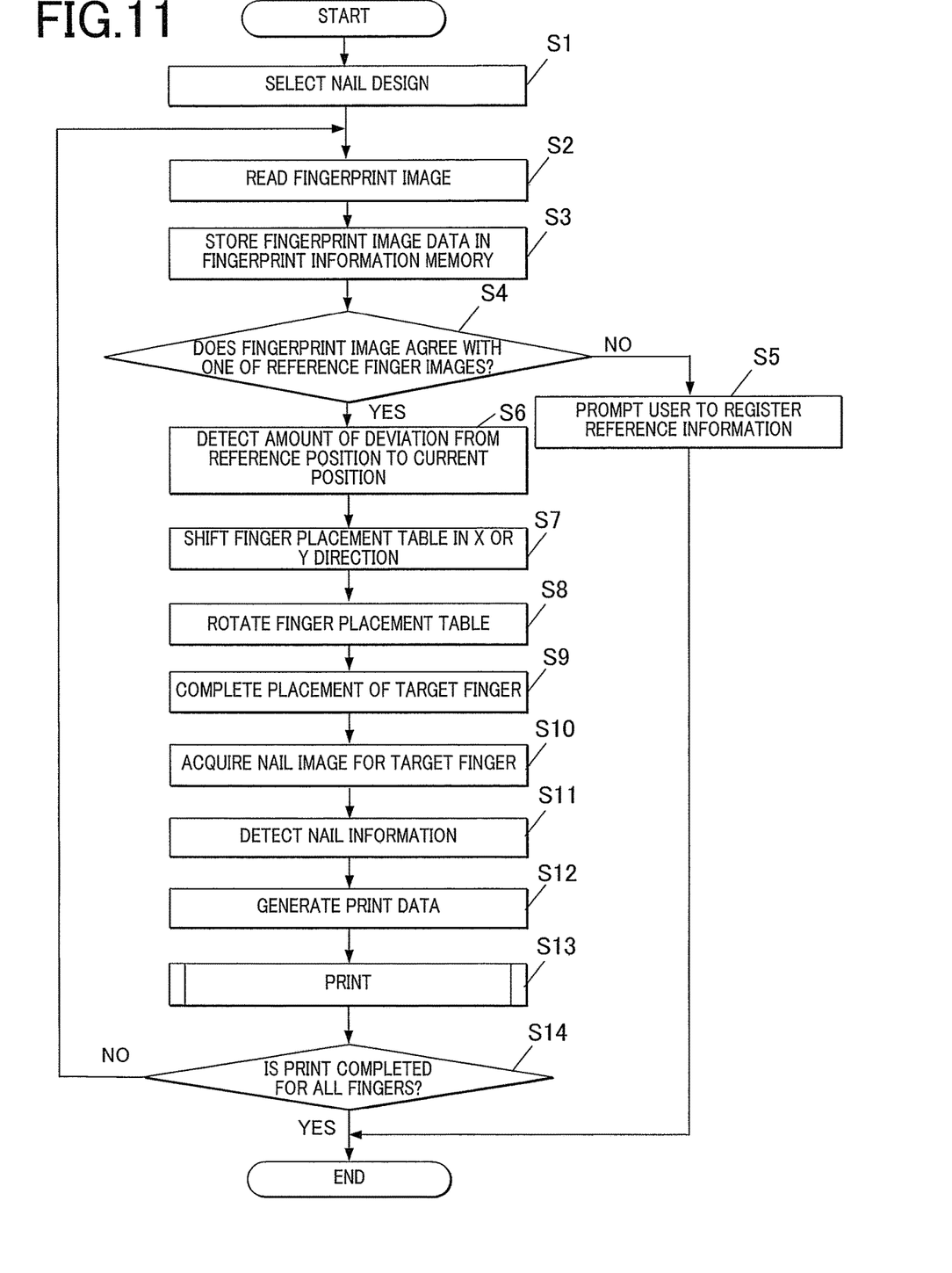
FIG. 11 is a flowchart illustrating a print process of the nail printer according to the embodiment.

The operations of the nail printer 1 according to this embodiment will be explained with reference to FIG. 11.

The nail printer 1 according to this embodiment preliminarily stores reference information on all the target fingers (for example, all the ten fingers of the right and left hands of the user) in the fingerprint information memory 822 at any time point before the print on the nail T, although this process is not shown.

In detail, the user sequentially places each target finger U1 on the finger placement table 65 at the position suitable for printing a nail design on the nail T with the printer 40, i.e., the position where the centers of the length in the width and length directions of the nail T is almost provided at the intersection of the dashed cross lines, and the length direction of the nail T substantially extend along the vertical line (the Y direction) of the dashed cross lines, as shown in FIG. 6, in this embodiment. The fingerprint sensor 67 acquires a fingerprint image (biological information pattern) and its positional information of the target finger U1 placed at the position, and preliminarily stores them in the fingerprint information memory 822 as reference information including the reference fingerprint image (biological information pattern) and the reference positional information.

The user who wants to print a nail design on the nail T with the nail printer 1 according to this embodiment selects a nail design that the user wants to print on the nail T through input operations of the operation panel 22. This sends an operation signal to, the controller 80, and the desired nail design is selected for print on the nail T as shown in FIG. 11 (Step S1).

After the selection of the desired nail design, the user places a target finger U1 on the finger placement table 65.

After the placement of the target finger U1 on the finger placement table 65, the fingerprint sensor 67 reads the fingerprint image of the target finger U1 (Step S2).

In the case where the target finger U1 is placed outside the finger placement table 65 or in a range not readable by the fingerprint sensor 67 or where the placement of the target finger U1 cannot be detected for a certain period of time, the nail printer 1 may display a message indicating that the target finger U1 cannot be detected or asking the user to place the finger properly on the display 23 to prompt the user to re-place the target finger U1. If the nail printer 1 is equipped with a speaker, an audio message may be used.

After reading the fingerprint image of the target finger U1, the fingerprint sensor 67 stores data of the read fingerprint image in the fingerprint information memory 822 of the memory 82 (Step S3).

The fingerprint comparator 812 compares the fingerprint image (for example, see FIG. 7) of the target finger U1 read by the fingerprint sensor 67 with the reference fingerprint images (for example, see FIG. 6) in all the multiple pieces of reference information preliminarily stored in the fingerprint information memory 822 (Step S4) to find a reference fingerprint image that matches the fingerprint image of the target finger. This determination is made, for example, by any pattern matching technique.

If the fingerprint image (for example, see FIG. 7) of the target finger U1 read by the fingerprint sensor 67 does not agree with any reference fingerprint image (for example, see FIG. 6) in the multiple pieces of reference information stored in the fingerprint information memory 822 (Step S4: NO), the nail printer displays a message of, for example, "Register reference information" on the display 23 to prompt the user to register the reference information (Step S5) and terminates the print. In this case, the user registers the fingerprint image and its positional information of the target finger U1 to the fingerprint information memory 822 as reference information.

If the fingerprint image (for example, see FIG. 7) of the target finger U1 read by the fingerprint sensor 67 agrees with a reference fingerprint image in the multiple pieces of reference information preliminarily stored (Step S4: YES), the fingerprint comparator 812 then compares the fingerprint image (for example, see FIG. 7) of the target finger U1 with the agreed reference fingerprint image (for example, see FIG. 6) to detect the degree of deviation between the positional information on the fingerprint image of the target finger U1 and the reference positional information, i.e., the distance of deviation of the position of the target finger U1 relative to the reference position (Step S6).

In response to the detection by the fingerprint comparator 812 of the degree of deviation between the positional information on the fingerprint image of the target finger U1 and the reference positional information, the finger placement table controller 813 drives the X-direction shifting motor 665 and/or the Y-direction shifting motor 666 to shift the finger placement table 65 in the X and/or Y direction(s) based on the distance of deviation (Step S7) (See FIGS. 8 and 9). After the correction of the deviation in the X and/or Y direction(s), the finger placement table controller 813 checks for any tilt of the target finger U1 placed on the finger placement table 65. If the target finger U1 tilts, the finger placement table controller 813 drives the finger placement table rotating motor 667 to rotate the finger placement table 65 clockwise or counterclockwise, thereby rotating the target finger U1 clockwise or counterclockwise (Step S8) (FIG. 10).

This ensures that the fingerprint FP of the target finger U1 is placed at the same position and in the same orientation with those of the reference position, as shown in FIG. 10, and the placement of the target finger U1 is completed (Step S9).

In response to an instruction to start printing from the operation panel 22, the imaging controller 811, which controls the imager 51 and the illuminators 52 of the image capturing unit 50, causes the imager 51 to capture the image of the target finger U1 placed on the finger placement table 65 to acquire a nail image (an image of the target finger U1 including the nail T) before start of the printing (Step S10).

After the acquiring the nail image, the nail information detector 814 detects the outline which is a contour of the nail T based on the nail image. The nail information detector 814 detects the curved shape and other nail information on the nail T based on the nail image (Step S11).

The print data generator 815 generates print data (for the nail design) used to print the nail design selected by the user on the nail T based on nail information detected by the nail information detector 814 (Step S12).

After the generation of the print data, the print controller 816 outputs the print data to the printer 40 and causes the print head moving mechanism 49 to move the print head 41, as needed, to perform printing based on the print data (Step S13).

The processor 81 checks for the completion of the print for all the target nails T (Step S14). If the print is complete (Step S14: YES), the processor 81 terminates the print.

If the print is not completed for one or more target nails T (Step S14: NO), the user places the next finger on the finger placement table 65, and the processor 81 proceeds back to Step S2 to repeat the process.

In this embodiment, the user places the target finger U1 having a target nail T on the finger placement table 65, and the fingerprint sensor 67 as the biological information acquirer takes a fingerprint image as biological information pattern from the target finger U1, as described above. The fingerprint information on the target finger U1, when the nail T of the target finger U1 is placed at a position suitable for printing on the surface of the nail T, is preliminarily stored in the fingerprint information memory 822 as reference information. The fingerprint comparator 812 compares the fingerprint information acquired by the fingerprint sensor 67 with the preliminarily stored reference information, and the finger placement table controller 813 shifts the finger placement table 65 in the planar direction while the target finger U1 is being placed thereon until the position of the target finger U1 agrees with the reference position based on the results of the compering.

As described above, reference information stored in the nail printer allows the finger placement table 65 to be shifted to a position suitable for printing even if the user fails to place the target finger U1 at a right position before print.

This can save the effort to position the target finger U1 accurately every time the user performs nail printing.

This can also reduce user's burden, as compared with fixing the target finger U1 with a fixture, facilitating high-definition nail print.

The function to correct the positional deviation of the target finger U1 such that the target finger U1 is placed at a right position and in a right orientation does not need the correction of nail design data, such as rotation of the nail design data in alignment with the position and orientation of the nail T. This can enhance the fitting of the nail design with the nail T.

In this embodiment, the finger placement table shifter 660 includes the X-direction shifting motor 665 and the Y-direction shifting motor 666, which function as an XY shifter shifting the finger placement table 65 in the X and Y directions, and includes the finger placement table rotating motor 667, which functions a rotator rotating the finger placement table 65 in the planar direction.

Besides the positional deviation of the target finger U1 in the X and/or Y direction(s), this configuration can correct the tilt of the length direction of the nail T on the finger placement table 65 relative to the vertical line (the Y direction, see FIG. 6) of the dashed cross lines by operating the finger placement table rotating motor 667 as a rotator for nail printing in a right orientation.

A straight placement of the target finger U1 along the direction of finger insertion significantly enhances the recognition of the nail shape.

In this embodiment, the nail printer 1 is provided the image capturing unit 50 taking a nail image of the target finger U1 placed on the finger placement table 65, and the nail information detector 814 detecting the shape of the nail T from the nail image acquired by the image capturing unit 50.

Therefore, it is possible to correctly recognize the shape of the target nail T to be printed perform high-definition printing on the nail T.

A positional or tilt deviation of the nail T prevents the image capturing unit 50 from capturing a nail image properly due to an uneven shade in the captured image. In this embodiment, since the detection of nail information can be performed after correcting the position of the target finger U1 to the correct position, leading to more accurate recognition of the nail.

The embodiment of the present invention has been described above, but the embodiment should not be construed to limit the present invention and may be appropriately modified within the gist of the present invention.

For example, this embodiment states that the biological information pattern is a fingerprint image, which is acquired with the fingerprint sensor 67 as a biological information acquirer. Alternatively, the biological information pattern may be any image from which the position and orientation of the target finger U1 can be read, other than the fingerprint image.

For example, the biological information pattern may be a vein in the target finger U1. In this case, the biological information acquirer is equipped with a sensor that can recognize veins.

In this embodiment, the finger placement table shifter 660 is a three-axis driver that can shift the finger placement table 65 in the X and Y directions and rotate it in the planar direction. Alternatively, the finger placement table shifter 660 may be five or six-axis driver.

For example, if the target finger U1 is placed on a finger placement table 65 while being tilted about the finger axis, the finger placement table shifter may have a function that can correct the tilt. For example, if the fingerprint sensor 67 as the biological information acquirer cannot read the right or left portion of the fingerprint, the unread portion is determined to be raised from the finger placement surface 651 of the finger placement table 65. The finger placement table shifter rotates the target finger U1 about the finger axis until the target finger U1 reaches a position where the entire ball of the target finger U1 comes into contact with the finger placement surface 651 so that the fingerprint can be read in its entirety.

In this embodiment, the reference positional information on a preliminarily registered reference fingerprint image is used as reference information for positioning the target finger U1 at a right position. Alternatively, at the initial registration of the reference information preliminarily, the acquired reference information may be stored in correlation with the type of finger, user identification information and/or the like.

In the registration of the reference information for each user and for each type of finger, user's nail information or the nail design(s) selected by the user in the past may be stored in correlation with the reference information.

Such correlation of nail information, such as the curvature of the nail, and/or the nail design(s) with a reference fingerprint image read by the fingerprint sensor 67 eliminates the need to detect the curvature of the nail T or request the user to select a nail design every time, facilitating the nail print based on registered information.

In this embodiment, the display 23 is disposed on the upper surface or top panel of the housing 21. Alternatively, the display 23 may be a screen of a terminal, such as a smart phone, that constitutes a print system that works in cooperation with the nail printer 1. The display of the terminal may be integrated with a touch panel for receiving various input operations on its surface. In this case, the touch panel functions as an operation panel. The terminal may be any device other than the smart phone, for example, a tablet personal computer (hereinafter referred to as "PC"), note PC, stationary PC or game terminal.

In this embodiment, the nail design memory 821 containing image data of nail designs is provided in the memory 82 of the nail printer 1. Alternatively, the image data of nail designs may be stored in any area other than the memory 82 of the nail printer 1.

For example, the image data of nail designs may be stored in a server connected via network and read out from the server.

For example, if the terminal constitutes a printing system that works in cooperation with the nail printer 1, a nail design memory containing the image data of nail designs may be provided in a memory of the terminal, and the user may select or enter a nail design from the operation panel of the terminal.

This allows the user to select a favorite design from more nail designs.

In this embodiment, the print head 41 of the nail printer 1 is an inkjet head 41 for inkjet printing. Alternatively, the print head 41 may be of any other type.

For example, the print head 41 may be provided with a pen holder accommodating a printing pen having a pen tip. The pen tip is attached to the surface of the nail T for print. The nail printer 1 may be equipped with both the inkjet head for inkjet printing according to this embodiment and the pen holder of the printing pen, so that multiple printing means are provided.

The nail printer 1 may include a drier equipped with a heater or fan to dry inks after print.

In this embodiment, the nail T of the target finger U1 is placed on the finger placement table 65 for imaging and printing. Alternatively, the target of print of the nail printer 1 according to this embodiment may be any item other than the nail T of the target finger U1.

For example, a nail chip attached to the nail T or a nail-shaped item may be a target of print of the nail printer 1.

The embodiments described above should not be construed to limit the scope of the present invention, and the claims and other equivalents thereof are included in the scope of the invention.

What is claimed is:

1. A nail printer, comprising:
   a print head which performs printing on a surface of a nail to be printed;
   a placement table on which an object having the nail is placed;
   a fingerprint sensor which acquires reference information including a reference fingerprint image and reference positional information on a position of the reference fingerprint image in the placement table from the object placed at a reference position which is a position suitable for printing on the surface of the nail of the object on the placement table with the print head;
   a memory which preliminarily stores the reference information acquired by the fingerprint sensor;
   a placement table shifter which shifts the placement table in a planar direction while the object is being placed; and
   a processor which is operable to:
   compare positional information on a fingerprint image of the object currently placed on the placement table with the reference positional information preliminarily stored in the memory; and
   control the placement table shifter to shift the object based on a result of the comparing such that the position of the object on the placement table substantially agrees with the reference position.

2. The nail printer according to claim 1, wherein the placement table shifter comprises:
   an XY shifter which shifts the placement table in an X direction which is a lateral direction of the placement table and in a Y direction which is a longitudinal direction of the placement table; and
   a rotator which rotates the placement table in the planar direction.

3. The nail printer according to claim 1, further comprising:
   a camera which takes a nail image from the object having the nail, the object being placed on the placement table, wherein the processor detects nail information from the nail image taken by the camera.

4. The nail printer according to claim 3, wherein the memory stores the reference information which includes the nail information in addition to the reference fingerprint image and the reference positional information.

5. The nail printer according to claim 1, wherein the memory stores the reference information which includes, in addition to the reference fingerprint image and the reference positional information, information on the object which includes at least a type of finger.

6. The nail printer according to claim 1, wherein the memory stores the reference information which further includes information that identifies an individual in addition to the reference fingerprint image and the reference positional information.

7. The nail printer according to claim 1, wherein the processor compares the fingerprint image of the object on the placement table with multiple reference fingerprint images preliminarily stored in the memory, and read out the reference fingerprint image that matches with the fingerprint image from the multiple reference fingerprint images.

8. The nail printer according to claim 1, further comprising:
   a display which shows a message if the reference fingerprint image is not properly acquired.

9. A nail printing method of a nail printer having a placement table on which an object having a nail to be printed is placed, the method comprising:
   acquiring reference information including a reference fingerprint image and reference positional information on a position of the reference fingerprint image in the placement table from the object placed at a reference position which is a position suitable for printing on a surface of the nail of the object on the placement table;
   preliminarily storing the reference information;
   comparing positional information on a fingerprint image of the object currently placed on the placement table with the reference positional information preliminarily stored; and
   shifting the placement table in a planar direction while the object is being placed based on a result of the comparing such that the position of the object on the placement table substantially agrees with the reference position.

* * * * *